United States Patent [19]

Marsilio

[11] Patent Number: 5,119,518
[45] Date of Patent: Jun. 9, 1992

[54] SANITARY FIXTURE HAVING AN EXTENDED DECK WITH A COATING OF VARIABLE THICKNESS

[75] Inventor: Ronald Marsilio, Mogadore, Ohio

[73] Assignee: American Standard Inc., New York, N.Y.

[21] Appl. No.: 625,510

[22] Filed: Dec. 11, 1990

[51] Int. Cl.$^5$ ............................................. A47K 3/02
[52] U.S. Cl. ........................................... 4/584; 4/619
[58] Field of Search ........................ 4/538, 584, 619; 428/36.4

[56] References Cited

U.S. PATENT DOCUMENTS

| | | |
|---|---|---|
| 2,820,228 | 1/1958 | Rodman . |
| 3,368,239 | 2/1968 | Wiltshire . |
| 3,419,457 | 12/1968 | Bleasdale . |
| 3,610,563 | 10/1971 | Allen . |
| 3,674,394 | 7/1972 | Wiltshire . |
| 4,244,993 | 1/1981 | Platka et al. ............... 428/36.4 |
| 4,398,648 | 8/1983 | Cerny et al. ............... 220/611 |
| 4,664,982 | 5/1987 | Genovese et al. . |
| 4,844,944 | 7/1989 | Graefe et al. . |
| 4,844,955 | 7/1989 | Graefe et al. . |
| 5,049,443 | 9/1991 | Kuszaj et al. . |

FOREIGN PATENT DOCUMENTS

| | | |
|---|---|---|
| 2951091 | 12/1979 | Fed. Rep. of Germany . |
| WO9109560 | 7/1991 | PCT Int'l Appl. . |
| WO9117040 | 11/1991 | PCT Int'l Appl. . |

Primary Examiner—Charles E. Phillips
Attorney, Agent, or Firm—Blum Kaplan

[57] ABSTRACT

A coated sanitary fixture having an extended deck with the coating under the deck having areas of reduced thickness of polymeric material.

Preferably, the distance from the outer edge of the shell's deck to the outer edge of an area of reduced thickness is about 16% of the length of the deck of the sanitary fixture. In an alternative embodiment, the deck has at least one outermost area of reduced thickness and at least one non-outermost area of reduced thickness. The outermost area is preferably about half the height of the non-outermost area. In another preferred embodiment, the deck includes at least one outermost area of reduced thickness and at least one non-outermost area of reduced thickness. The height of the outermost area varies from a maximum height near the middle of the deck, to a minimum height near the end of the deck.

16 Claims, 13 Drawing Sheets

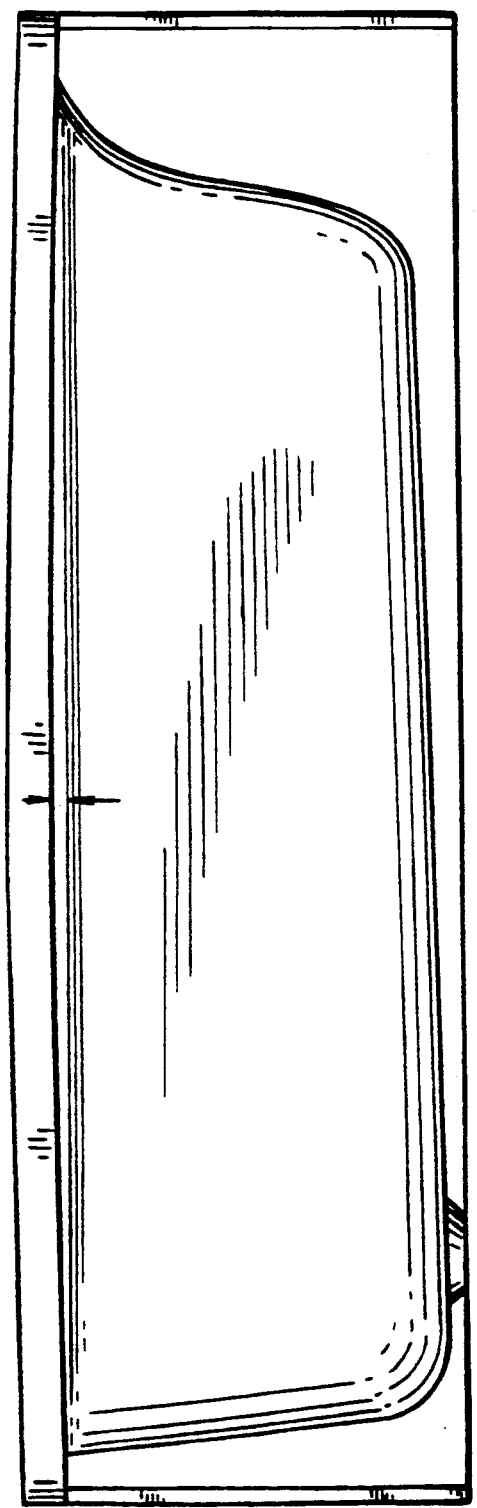
FIG. 5

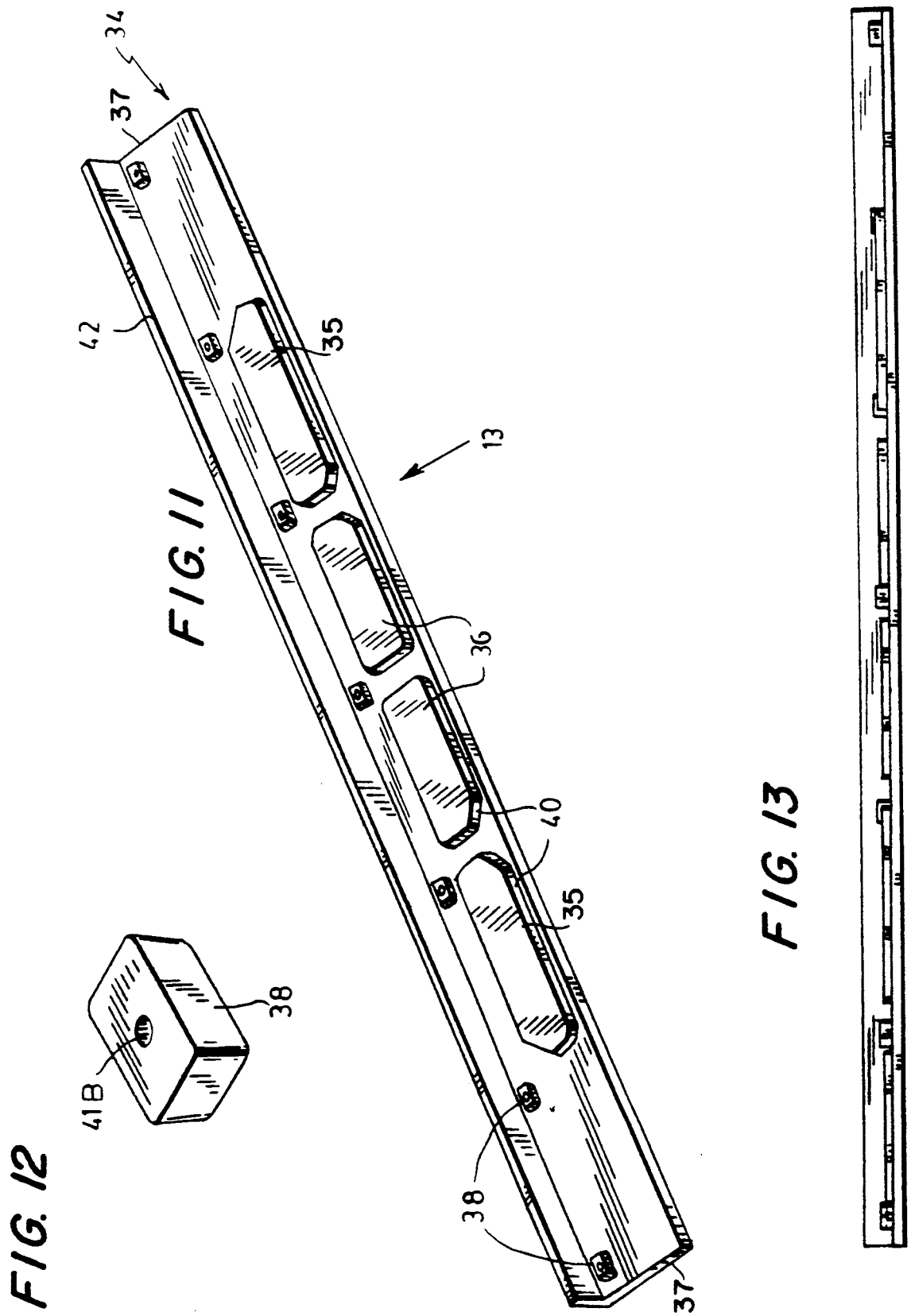

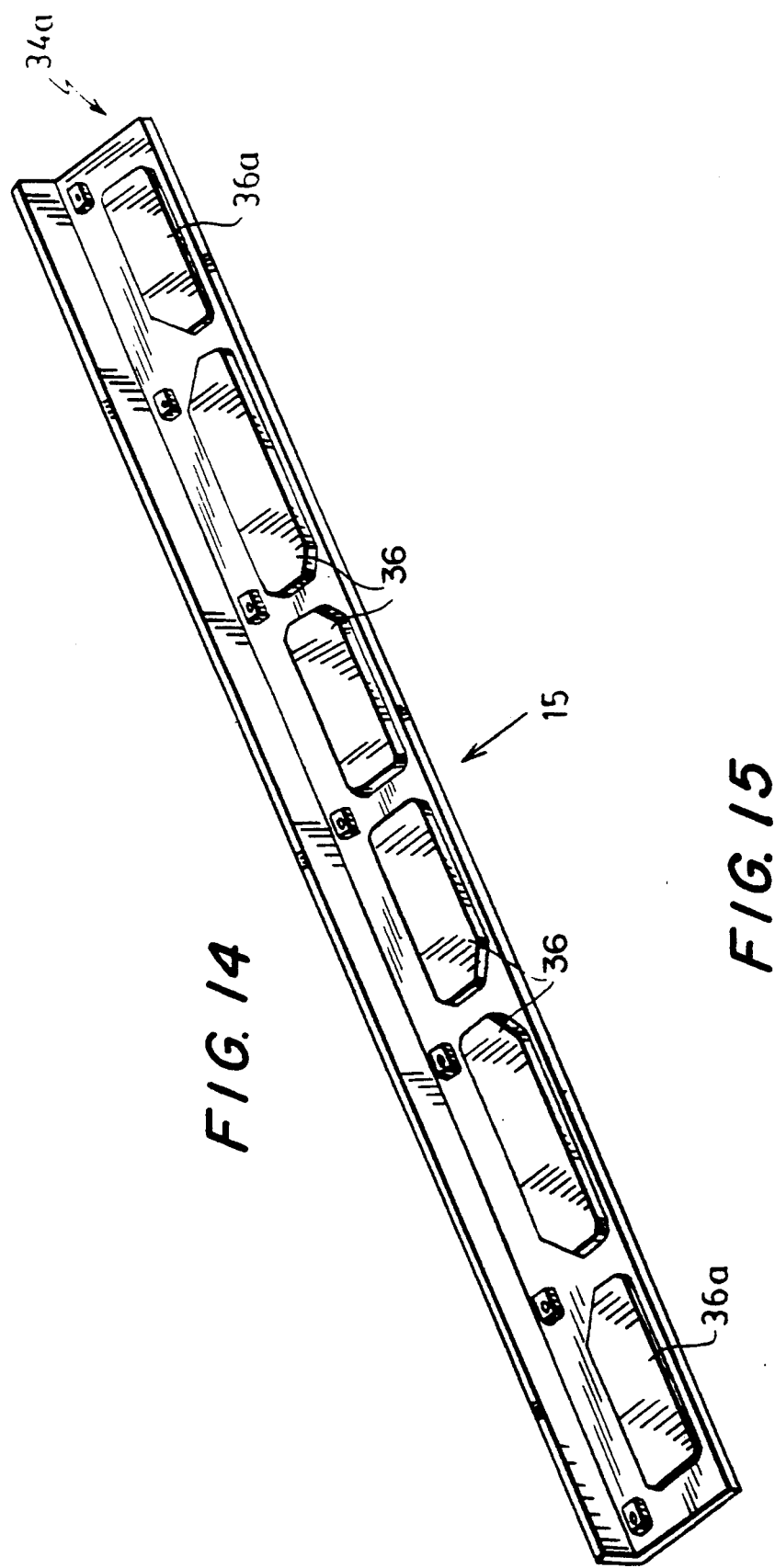
FIG. 14
FIG. 15

SANITARY FIXTURE HAVING AN EXTENDED DECK WITH A COATING OF VARIABLE THICKNESS

BACKGROUND OF THE INVENTION

1. Field of the Invention

The present invention relates to sanitary fixtures having a reservoir and a deck on one side of the reservoir, and a process for molding involving the use of an extended deck insert attached to a mold.

2. Background of the Related Art

In the development of bathtubs, porcelain-cast iron fixtures have gradually been replaced by lighter and more resilient composite structures. One of the difficulties with the porcelain-cast iron and enamelled fixtures has been their susceptibility to impact damage and their extreme weight which makes movement and installation of large fixtures such as bathtubs and whirlpool tubs difficult. The porcelain-cast iron fixtures did have the advantage of having a very solid feel and high weight bearing capability.

Initial attempts by the industry to replace these porcelain-cast iron fixtures proved difficult. The thin stainless steel fixtures were lighter than the porcelain-cast iron fixtures but did not have the solid feel, or structural strength required for large articles such as bathtubs and whirlpool tubs. The early composite structures had a plastic, hollow feel and would deform, crack, chip or delaminate when subjected to impact, thermal shock or the weight of the typical bather. Production of these tubs required the use of a large amount of polymeric material which increased the weight of the tub and increased the cost of manufacture. Furthermore, certain polymeric materials or resins shrink upon curing. This resulted in bowing, warpage, and distortion of the tubs. This problem is especially acute on extended deck portions which are often provided on luxury bathtubs. The shrinkage and bowing of the polymeric material weakens the structural strength of extended decks which must support the weight of the user. Shrinkage and bowing also has resulted in negative drainage, from the deck's surface to the outside wall, leaving pools of water at the edge of the deck.

Commonly assigned U.S. patent application Ser. No. 07/458,598 to Marsilio et al., which is incorporated by reference herein, describes lightweight composite plumbing fixtures, such as bathtubs which have the look, feel and strength of porcelain-cast iron fixtures but not the susceptibility to impact damage and extreme weight of porcelain-cast iron fixtures. These plumbing fixtures are produced in a mold having an apron insert. The apron insert is used to produce a bathtub having an area of reduced thickness in the polymeric material on the non-finish side of the apron. The area of reduced thickness serves to alleviate the problems of distortion, bowing and warpage associated with the shrinkage of polymeric material in the apron portion of the tub. This invention is not concerned with solving the shortcomings of extended deck tubs. Accordingly, when extended decks are provided with such bathtubs, they still suffer from the problems typically associated with shrinkage of the polymeric material. This shrinkage causes negative drainage and weakens the structural strength of the deck.

Commonly assigned U.S. patent application Ser. No. 07/516,284 to Marsilio et al., which is incorporated by reference herein, describes polymeric composite molded structures having a polymeric shell layer, a fiber reinforced resin layer adhered to the non-finish side of the shell. A weight bearing reinforcing structure (such as chip-board) is adhered below the reservoir to the non-finish side of the shell. A plurality of reinforcing wooden planks are placed below the deck portion of the shell. While the planks add some strength and rigidity to the deck, the use of the planks does not solve the problems due to shrinkage of the polymeric material, and does not fully alleviate bowing if used in molding an extended deck bathtub.

Reinforcing grids have been used to add strength and rigidity to the surface of bathtubs. For example, U.S. Pat. No. 2,820,228 describes the reinforcement of a bathtub by a gridwork secured to the bottom of the tub. The gridwork may also extend to the sides of the tub in order to deaden vibrations. Although the gridwork adds strength, it also adds weight, requires additional steps and materials in the manufacturing process and does not strengthen the deck.

The use of ribs to add structural rigidity and reduce weight have been described in the formation of composite structures. For example, U.S. Pat. No. 3,419,457 discloses a sheet having a plurality of ribs which intersect and are united at their respective points of intersection. A sheet, having the ribs, is combined with another sheet to form a composite structure. The composite structure has two layers of reinforced plastic each elevated and separated from the other by the ribs. The ribs add structural rigidity while reducing weight. While the laminated, ribbed structure reduces weight and adds rigidity, it requires additional manufacturing steps and complicates the manufacturing process.

Various patents describe creating cavities in molded articles. For example, U.S. Pat. Nos. 3,610,563, 3,674,394 and 3,368,239 describe methods for forming articles, such as tanks and similar molded hollow articles. During the molding operation, a balloon or tube is expanded in the mold, resulting in the production of a hollow article. The balloons and tubes are not rigid enough to withstand the pressures and high temperatures encountered during the injection molding process. Further, the balloons and tubes would be deformed by the molding material resulting in irregularities in shape, and weakening the structure of the molded object.

German Patent DT 2951091 describes the formation of a plastic bathtub which has parallel tubes extending the length of a flange. The tubes may be filled with foam or other materials. The purpose of the tubes is to add rigidity to the tub and reinforce the structure, taking the place of heavy steel rods, which were formerly used to reinforce the tub. The tubes are only useful in areas having a large cross-section, may be difficult to insert during the molding process and add complexity to the manufacturing operations.

Commonly assigned U.S. Pat. No. 4,664,982 to Genovese et al. and patent application Ser. No. 07/400,289 to Kuszaj et al., both of which are incorporated by reference herein, describe polymeric foam backed enamelled-carbon steel or stainless steel plumbing fixtures that are resistant to chipping, cracking, crazing, delamination or deformation when subjected to impact from either the finish or non-finish side. The use of the aforementioned composite structures results in fixtures which have the feel of porcelain-cast iron and enameled fixtures, high impact strength and resistance to delamination. These composite structures possess excellent physical and mechanical properties as the result of the chemical bonding of the reinforced foamed polymeric layer to the enamelled steel or stainless steel shell. A problem with such fixtures, however, is that a large amount of polymeric material is used in certain portions of the tubs, resulting in increased weight and increased cost. In addition, in the portions having wider cross-sectional areas of polymeric material, the fixtures are subject to problems due to distortion, bow, and warpage from the shrinkage of the polymeric material as it cures. They suffer distortion, bow and warpage in the thicker portions (such as an extended deck portion) due to the inability of the polymeric material to release heat and gas produced during the curing process.

In another process the enamelled-steel shell is replaced with a polymeric-cosmetic surface layer and is bound directly to a foamed plastic substrate to provide a high impact strength delamination-resistant structure. This approach is disclosed in commonly assigned U.S. Pat. Nos. 4,844,944 and 4,844,955, both to Graefe et al., the disclosures of which are incorporated by reference herein. The approach suffers from the same problems described above with regard to U.S. Pat. No. 4,664,982 and application Ser. No. 07/400,289.

Accordingly, none of the related art describes a method for molding fixtures which allows for the reduction of weight and/or thickness of the deck portion of the molded fixture while alleviating the problem of shrinkage of the polymeric material below the deck which causes negative drainage and weakens the structural strength of the deck.

It is, therefore, an object of the present invention to provide a lightweight composite plumbing fixture such as a bathtub which does not suffer from the negative drainage and weakened deck structure problems associated with the shrinkage of polymeric materials.

It is also an object of the present invention to provide an attachment for molding a plumbing fixture such as a bathtub which does not suffer from warpage, bow and negative drainage problems associated with the shrinkage of polymeric materials in deck areas having a relatively large cross-section.

SUMMARY OF THE INVENTION

These and other objects are achieved by the present invention which provides a method for molding articles, such as bathtubs, whirlpool tubs and other sanitary fixtures having an extended deck area. The deck surrounds the sump or reservoir of the tub. A layer of polymeric material is molded to a non-finish side of the bathtub shell. The shell has a deck, an interior non-finish side and an exterior finish side. The non-finish side is coated with a polymeric material and has an area of reduced thickness in a polymeric material coating the deck. The outermost edge of the area of reduced thickness is preferably a distance from a deck end which is about 16% of the distance between the deck ends. The area of reduced thickness in the polymeric material comprises at least one indentation, and preferably a plurality of indentations, in the polymeric material. Most preferably the indentations have a chamfered edge at an angle of about 45° as measured from the base of the insert. Preferably, the finish side of the shell is made from steel coated with a ceramic material. The shell may suitably be constructed of a metal, plastic, fiberglass or polymeric material. Most preferably, the shell is constructed of steel or stainless steel.

The preferred deck insert has at least one projection designed to reduce the cross-sectional area of a portion of a void between the shell's deck and the deck forming face of the molded center. Preferably, the distance from the outer edge of the shell's deck to the outer edge of the projection is about 16% of the length of the deck of the sanitary fixture. In an alternative embodiment, the deck insert has at least one outermost projection and at least one non-outermost projection. The outermost projection is preferably about half the height of the non-outermost projection. In another preferred embodiment, the deck insert includes at least one outermost projection and at least one non-outermost projection. The height of the outermost projection varies from a maximum height near the middle of the deck, to a minimum height near the end of the deck.

The present invention also includes a mold for manufacturing molded articles. The mold includes a mold receptor for receiving a shell having a deck, a reservoir, a finish side and a non-finish side. The receptor receives the shell so as to define a void between the non-finish side of the shell and a face of the receptor. A deck insert is removably attached to the deck forming face of the mold receptor by a suitable attachment means. The deck insert is shaped to reduce a cross-sectional area of a portion of a void between the shell's deck and the deck forming face of the mold receptor. Suitably, the deck insert is removably attached to the deck forming face of the mold receptor. Preferably, the mold includes a mold closing means for removably engaging a finish side of the shell to the mold receptor. The deck insert has an attachment face communicating with the mold receptor face and a molding face on the opposite side of the insert. Preferably, the deck insert has a bevelled edge on the periphery of the molding face tapering toward the mold receptor face. Most preferably, the molding face of the insert has a plurality of projections. Preferably, the bevelled edge tapers at an angle of about 45°. The attachment means may include mechanical, hydraulic, suction, or magnetic attachment means. Preferably, the attachment means comprise a bolt extending through the deck insert and into a threaded aperture in the mold receptor face. Most preferably, a bolt extends through a locator fitted on the top surface of the insert.

In the method of molding the article of the present invention, an insert is attached onto a deck face of a mold receptor. A shell for forming a plumbing fixture having a reservoir and an extended deck is loaded onto the mold receptor, leaving a void between the mold receptor and a side of the shell. A void is also left between the deck insert and the deck of the shell. A hardenable polymeric material is introduced into the void, coating the non-finish side of the shell. The molded article, including the shell coated with the polymeric material, is removed from the mold receptor. Preferably the insert is removably attached to the face of the mold receptor. Most preferably, the temperature of the mold receptor is maintained in the range of about 85° to about 105° F. The hardenable material is preferably selected from the group consisting of plastic, polymeric material, composite and fiberglass.

For a better understanding of the present invention, reference is made to the following description, taken in conjunction with the following figures, the scope of which is pointed out in the appended claims.

BRIEF DESCRIPTION OF THE DRAWINGS

FIG. 5 is a side elevational view of the bathtub shell of FIG. 3 taken in the direction of arrow 5.

FIG. 11 is an elevated perspective view of the preferred extended deck insert of the present invention.

FIG. 12 is an enlarged perspective view of one urethane locator for fastening the extended deck insert illustrated in FIG. 11.

FIG. 13 is a side elevational view of the insert of FIG. 11 taken in the direction of arrow 13.

FIG. 14 is an elevated perspective view of an alternative embodiment of the extended deck insert of the present invention.

FIG. 15 is a side elevational view of the extended deck insert of FIG. 14 taken in the direction of arrow 15.

DETAILED DESCRIPTION OF THE INVENTION

Figure 1:
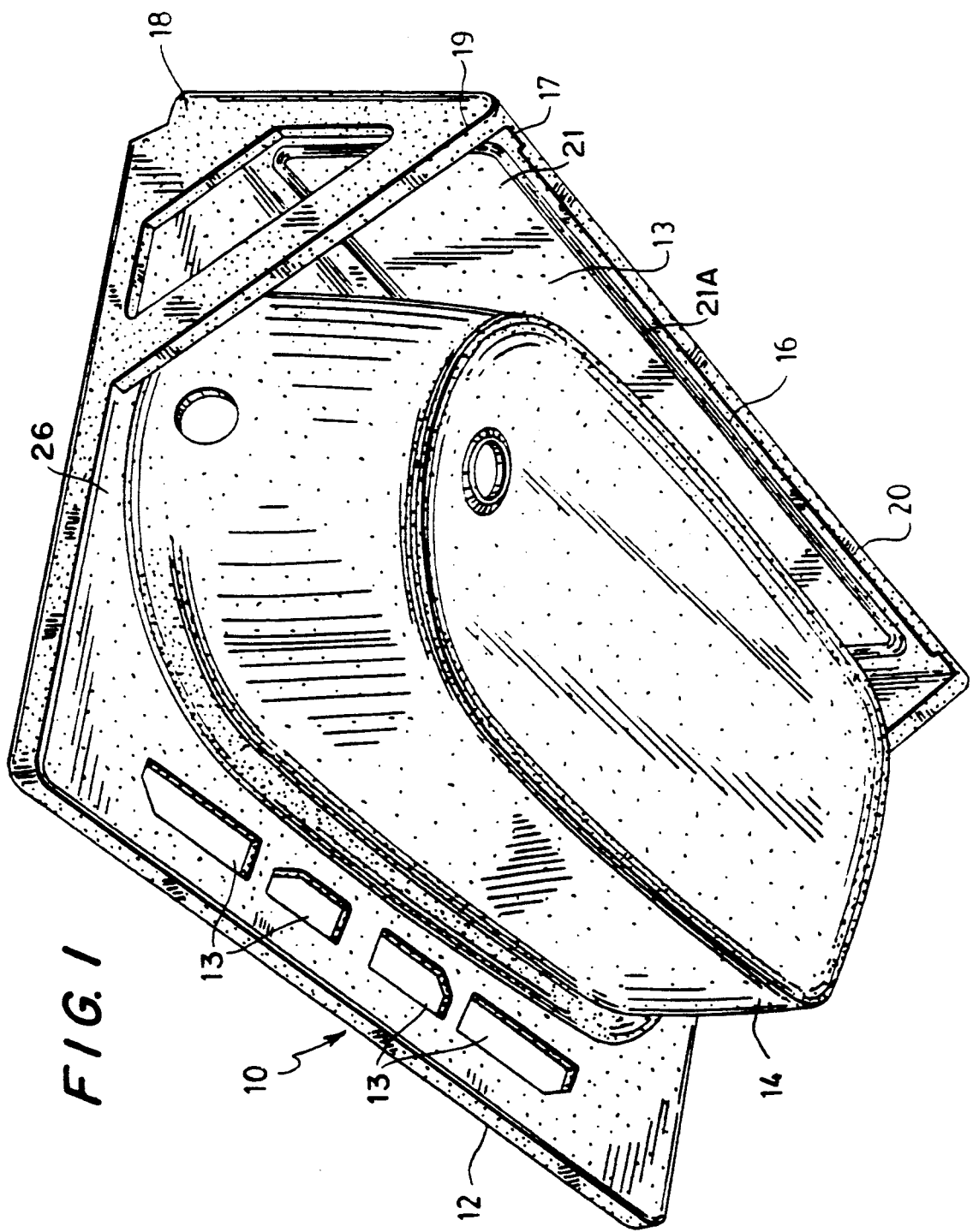
FIG. 1 is an underside perspective view of a preferred bathtub having an extended deck in accordance with the present invention showing the molded polymeric non-finish side.
Figure 2:
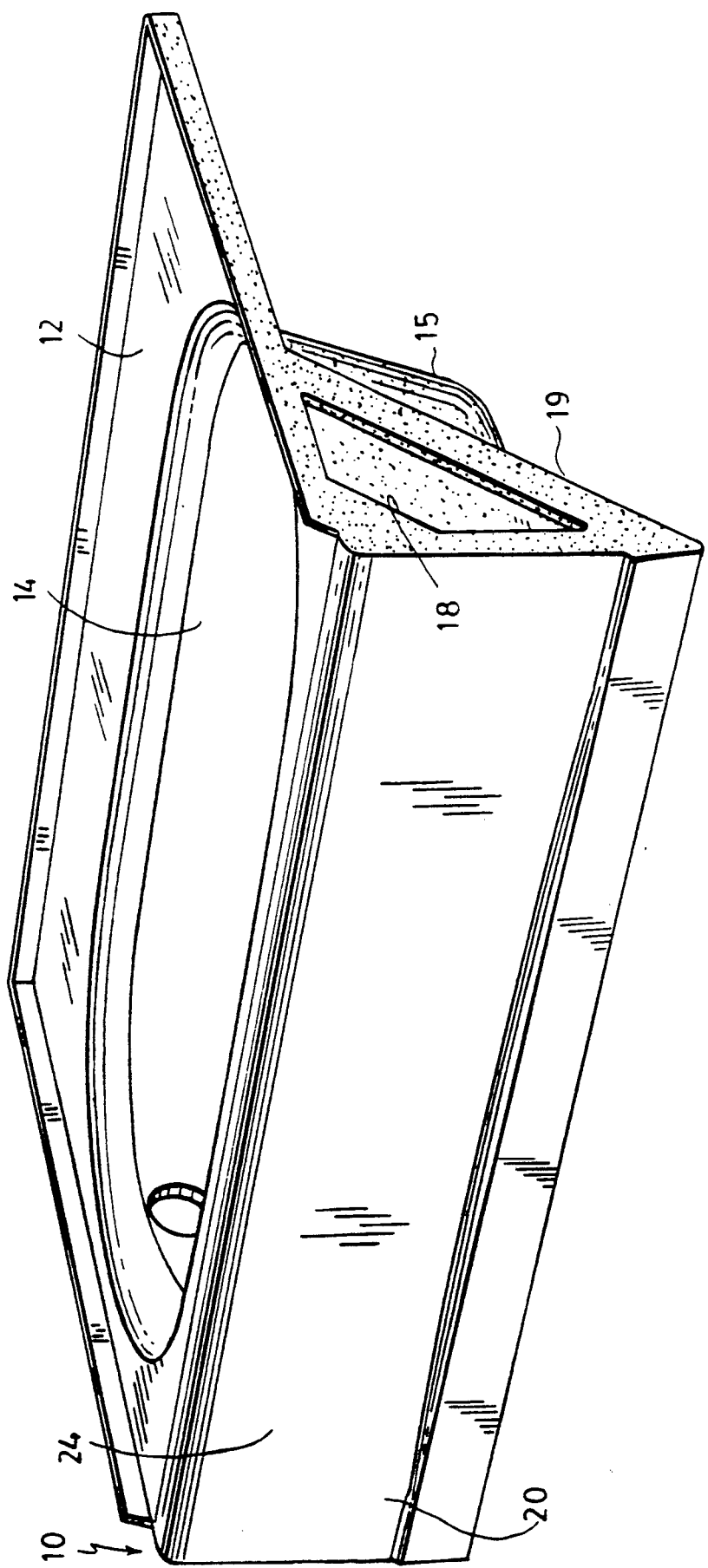
FIG. 2 is an elevated perspective view of the bathtub illustrated in FIG. 1 showing the finish side of the bathtub.

A molded bathtub 10 made in accordance with the present invention is shown in FIGS. 1 and 2. The molded bathtub 10 has an extended deck 12 surrounding a reservoir 14 and polymeric material 15 is molded to a non-finish side 26 of the bathtub shell 22. The molded bathtub 10 also includes an apron 20. Apron 20 extends downwardly from one side of the deck 12 until it terminates at an inwardly curved shell lip 17. In the embodiment illustrated in FIGS. 1 and 6, the shell lip 17 terminates the apron 20 at about the lowest level of the outside of the reservoir 14, however, in an alternative embodiment (not shown) the apron 20 may terminate either above or below the level of the bottom of the reservoir 14. The apron 20 is supported by two braces, a small inner brace 18, and a larger outer brace 19 on both the front and rear of the bathtub 10, which extend diagonally and upwardly from the ends of the apron 20 to the front and rear of bathtub deck 12. Alternatively, the tub may be a drop-in type tub without an apron (not shown).

Figure 6:
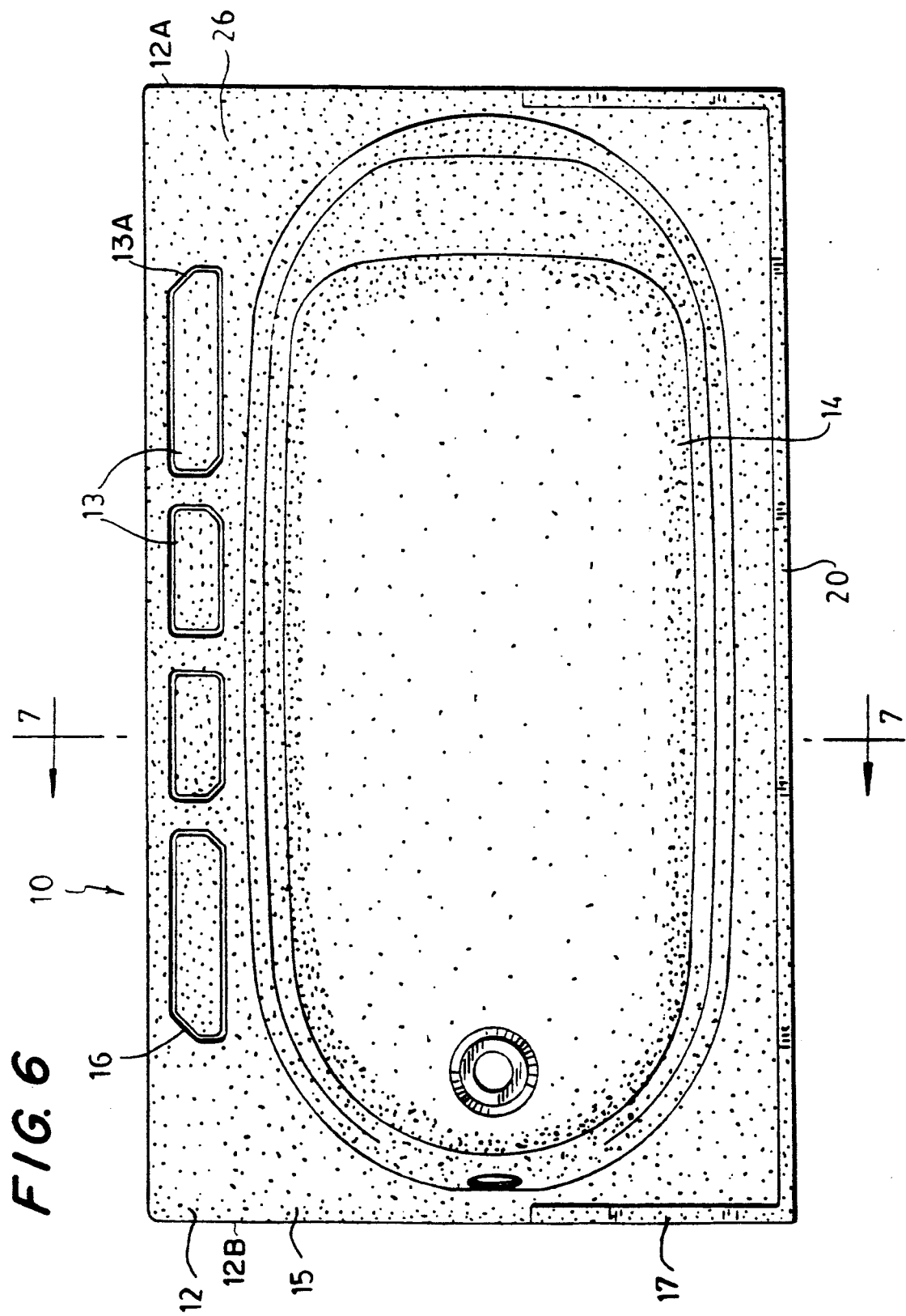
FIG. 6 is a bottom plan view of the bathtub of FIG. 1.

As shown in FIG. 6, the polymeric material 15 on the non-finish side 26 of deck 12 includes a plurality of areas of reduced thickness 13 on the non-finish side of deck 12. The area of reduced thickness 13 is surrounded on each side of its periphery by a lip 16 having a chamfer of approximately 45°. The outermost edge 13A of the reduced thickness is preferably at least a distance from a deck end 12A which is from about 8% to about 24% of the distance between deck ends 12A and 12B. Preferably, the distance is from about 12% to about 20% and most preferably, the distance is about 16% of the distance between deck ends 12A and 12B. Alternatively, the distance between the outermost edge 13A of the reduced thickness and the deck end 12A can be from about 4.875" to about 14.625". Preferably, the distance between the outermost edge 13A of the reduced thickness and the deck end 12A can be from about 7.3125" to about 12.1875" and is most preferably about 9.75".

Figure 7:
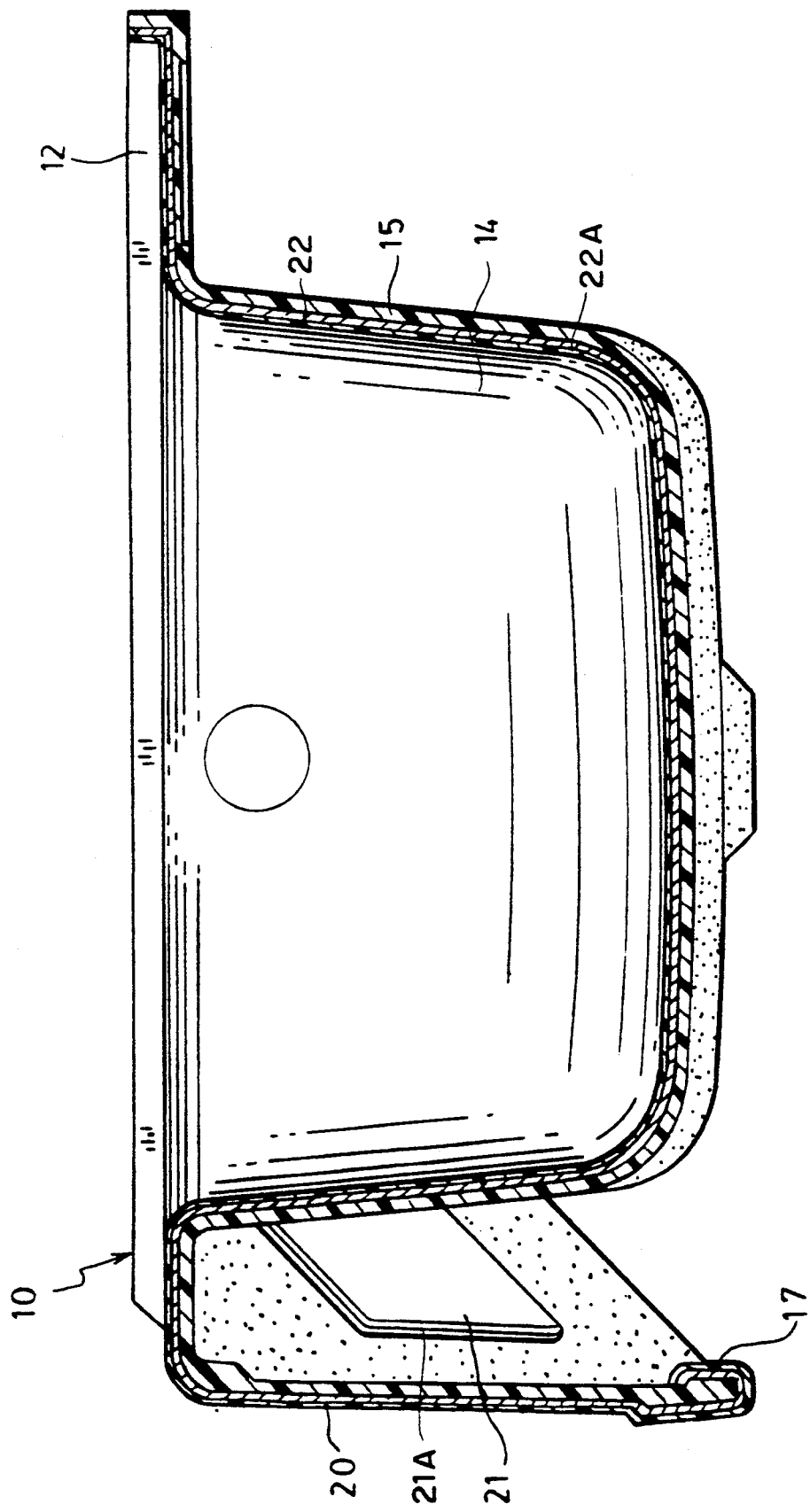
FIG. 7 is a lateral cross-sectional elevational view of the bathtub illustrated in FIG. 6, taken in the direction of arrows 7—7.
Figure 9:
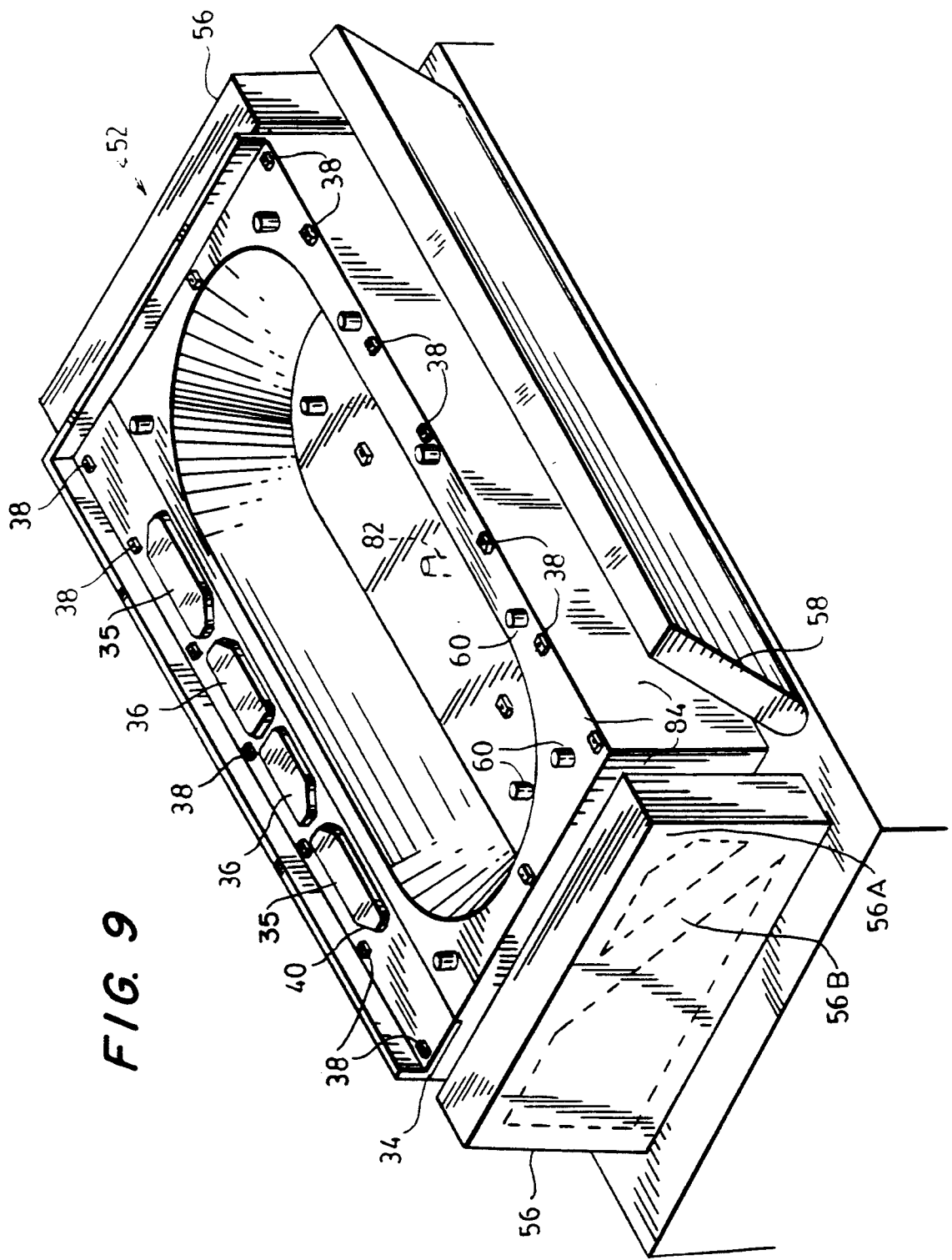
FIG. 9 is an elevated perspective view of a mold receptor with the preferred extended deck insert of the present invention mounted in place.

FIG. 6 shows a bottom plan view of the bathtub of FIG. 1 and clearly illustrates the areas of reduced thickness 13 on the non-finish side of deck 12 produced by the use of deck insert 34 (FIG. 9). FIG. 7 illustrates a lateral, cross-sectional view of the bathtub of FIG. 6, taken in a direction at the arrows 7—7. FIG. 7 clearly illustrates the polymeric material 15, the steel shell 22 and the ceramic coating 22A. FIG. 6 illustrates a preferred embodiment of the present invention. The bathtub shown in FIGS. 1 and 7 was made with the apron insert disclosed in commonly assigned U.S. patent application Ser. No. 07/458,598 to Marsilio et al. and clearly illustrates the area of reduced thickness 21 on the non-finish side of the apron 20 produced by the apron insert.

The molded bathtub 10 can be adapted to form a whirlpool tub by the drilling of appropriately placed holes in the reservoir 14. The molded bathtub 10 is made by molding the polymeric material 15 onto the non-finish side 26 of bathtub shell 22. The bathtub shell is illustrated in detail in FIGS. 3, 4 and 5. FIG. 5 illustrates the shell 22 with an extended deck which has bowed (see arrows b—b). The extended deck was bowed (see arrows b—b) during the heating and enamelling of the shell. Bathtub shell 22 has an interior finish side 24 and an exterior non-finish side 26. The non-finish side 26 is not ordinarily exposed to view after installation, while the finish side 24 is normally seen and contacted by the user after the bathtub has been installed.

Figure 3:
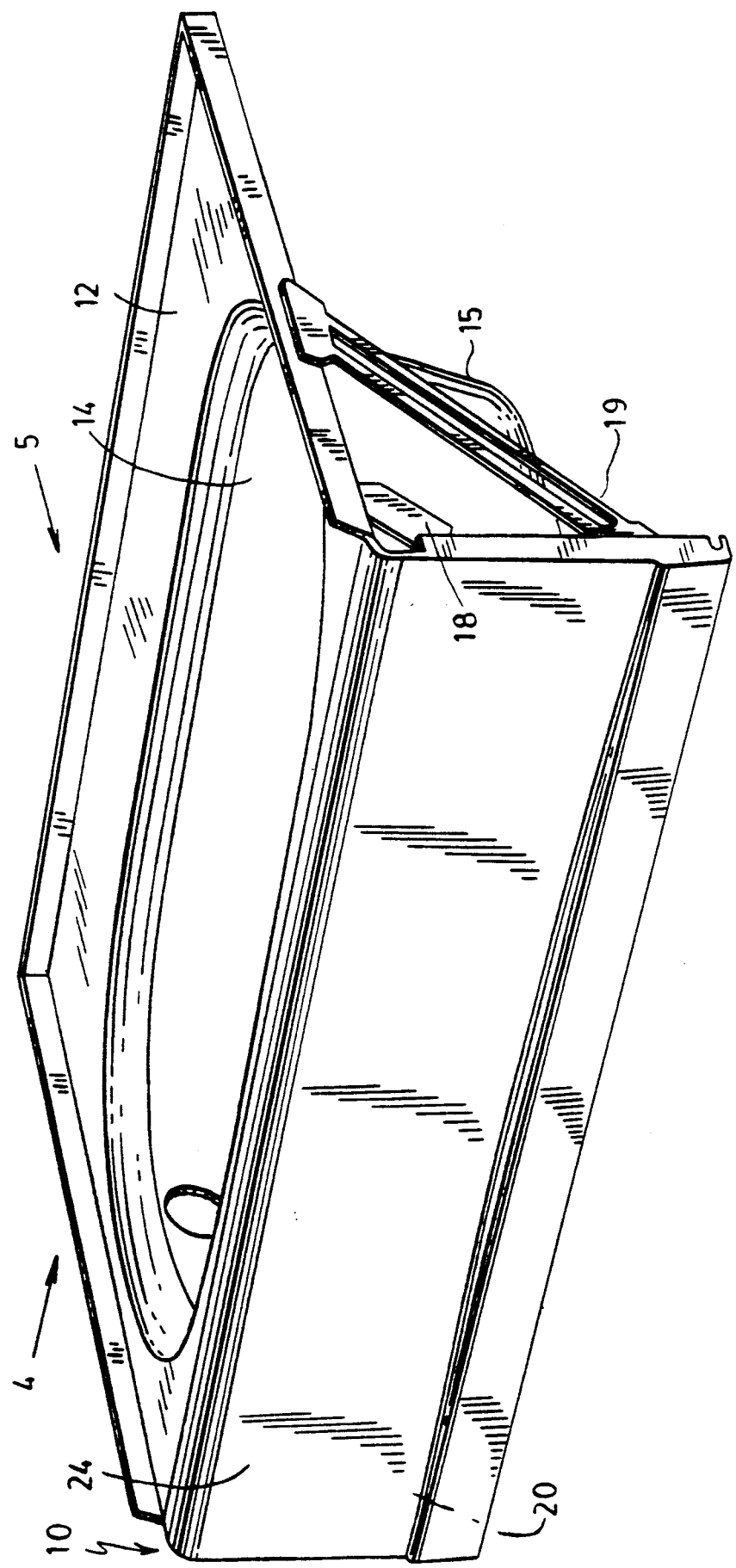
FIG. 3 is an elevated perspective view of a bathtub shell having an extended deck for use with the present invention.
Figure 4:
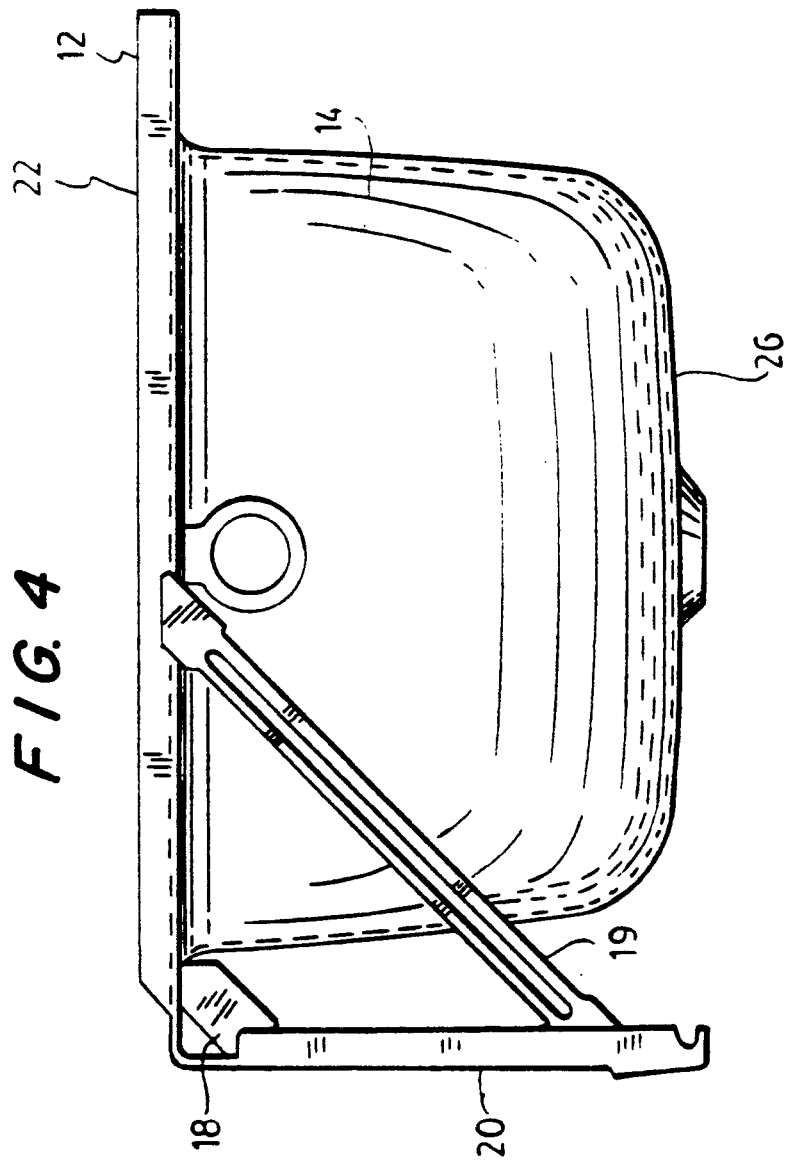
FIG. 4 is a side elevational view of a bathtub shell illustrated in FIG. 3 taken in a direction of the arrow 4.

Bathtub shell 22, illustrated in FIGS. 3, 4 and 5 is preferably constructed from a stamped sheet of steel which has been coated with an enamel on both its finish side 24 and non-finish side 26, as disclosed in commonly assigned U.S. Pat. No. 4,664,982 to Genovese et al., the disclosure of which is incorporated by reference herein. In another preferred embodiment the bathtub shell 22 may be steel which has not been coated with enamel on its non-finish side 26 as disclosed in commonly assigned U.S. patent application Ser. No. 07/400,289 to Kuszaj et al., the disclosure of which is incorporated by reference herein. Alternatively bathtub shell 22 may be constructed of a polymeric, fiberglass and/or the composite materials as disclosed in commonly assigned U.S. Pat. Nos. 4,844,944 and 4,844,955 to Graefe et al., and U.S. patent application Ser. Nos. 07/516,284 and 07/458,598, both to Marsilio et al., the disclosures of which are incorporated by reference herein. Likewise, the respective polymeric material 15 and primer suitable for each of the respective bathtub shell 22 constructions is also described in detail in the aforementioned U.S. Pat. Nos. 4,664,892, 4,844,944 and 4,844,955, U.S. patent application Ser. No. 07/458,598 to Marsilio et al. as well as in U.S. application Ser. No. 07/400,289 all of which have been incorporated by reference herein. The terms "polymeric material" and "hardenable material" include all material suitable for making the molded articles, including liquids, foams, pastes or gels contemplated by the present invention.

Figure 8:
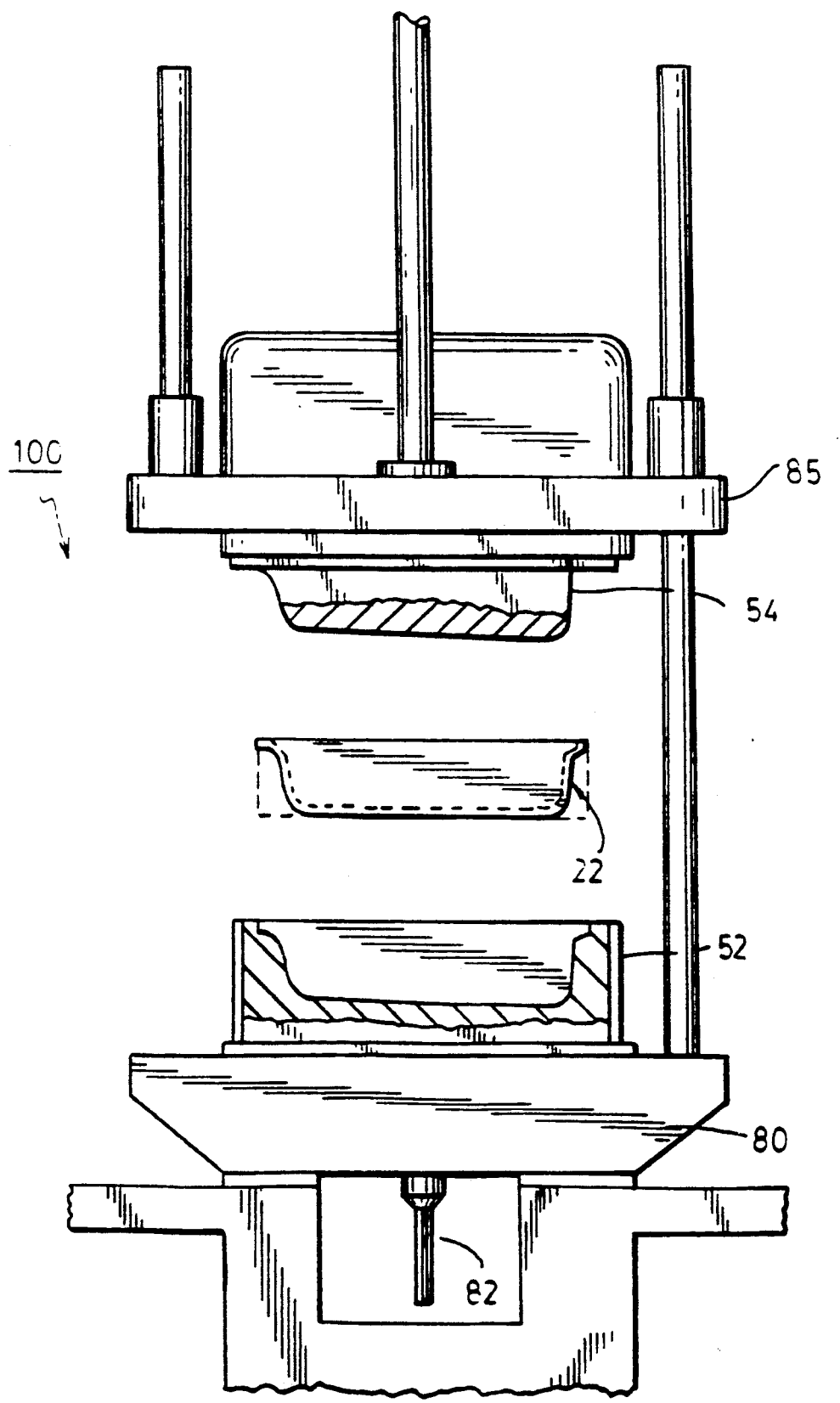
FIG. 8 is a schematic front elevational view of an apparatus for molding a bathtub in accordance with the present invention.

The bathtub of the present invention is made utilizing a mold press 100 illustrated in FIG. 8. Mold press 100 includes a platform 80 onto which a mold receptor 52 is mounted. A mix head 82 is positioned below platform 80 for injecting the polymeric foam 15 through a conduit in platform 80 and into the mold receptor 52. A preferred mix head is described in co-pending and commonly assigned U.S. patent application Ser. No. 07/499,188, the disclosure of which is incorporated by reference herein. Mold receptor 52 is adapted for receiving bathtub shell 22 leaving a void between the non-finish side 26 of the shell 22 and the mold receptor face 84.

Figure 10:
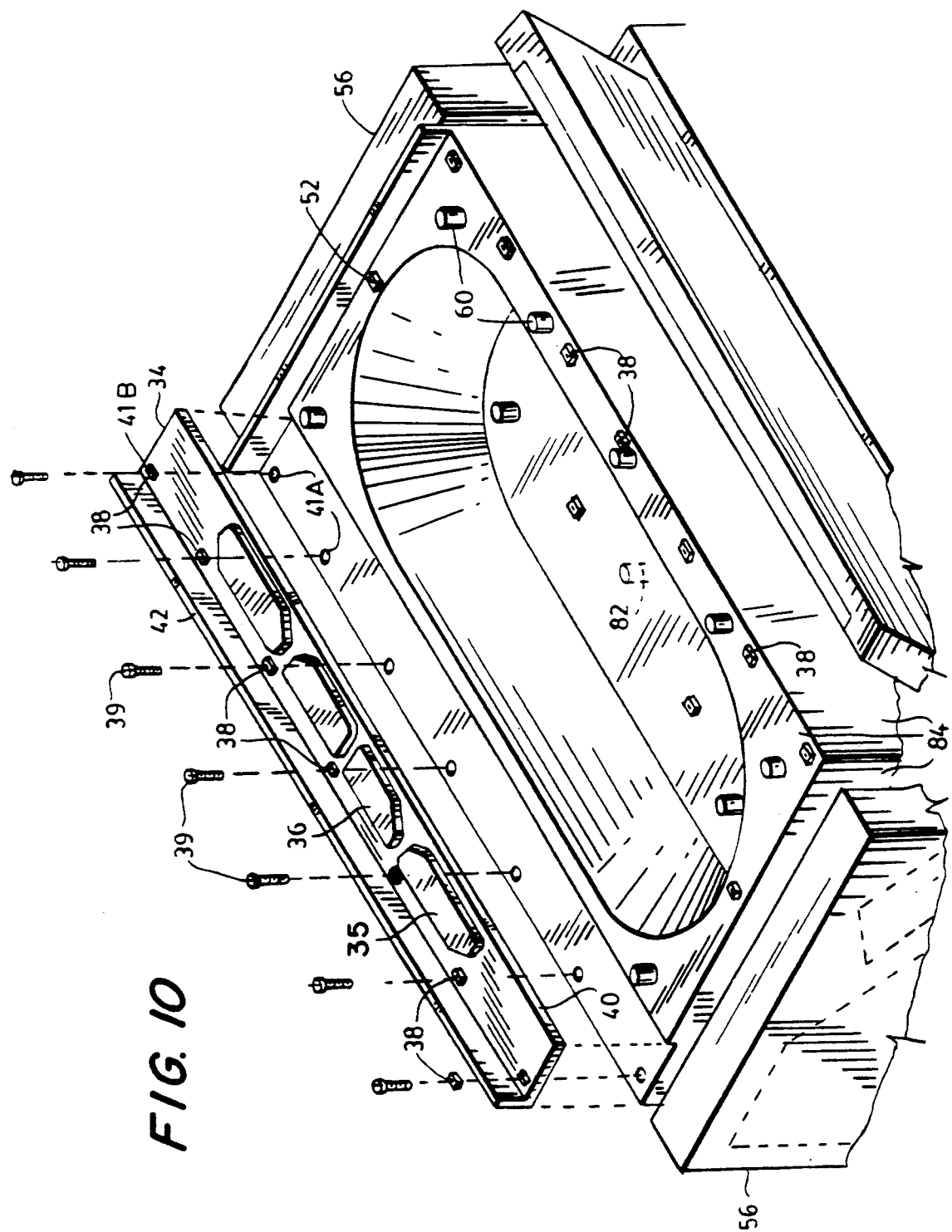
FIG. 10 is an assembly view of the mold receptor and extended deck insert shown in FIG. 9.

The male mold closing member 54 has a rubbery elastomeric surface which snugly fits into the bathtub reservoir 14 and extended deck 12 on the finish side 24 of the bathtub shell 22 sealing the shell 22 to mold receptor 52 and forming a closed cavity between the mold receptor face 84 and the shell's non-finish side 26. In a preferred embodiment, a thin, resilient and substantially flat insert is placed upon the finish side of the shell prior to molding as disclosed in copending and commonly assigned U.S. patent application Ser. No. 07/523,742 to Marsilio, which is herein incorporated by reference. The male mold closing member 54 also helps to minimize warp, bowing and distortion of the bathtub shell during the injection molding process. A hydraulically operated system 85 lowers and retains the male mold closing member 54 against the bathtub shell 22 and mold receptor 52 during the molding process. A mold press 100 which is suitable for molding bathtubs including the present invention is manufactured by Linden Industries, Inc. As illustrated in FIG. 9, the mold receptor 52 includes a mold receptor face 84 for forming a void between it and the non-finish side 26 of the bathtub shell apron 20. FIG. 10 details an assembly view of a preferred mold receptor and extended deck insert 34. The mold receptor 52 also includes a front apron door 58 which is covered with an elastomeric material to sealably engage and hold the apron 20 of the bathtub shell to the mold receptor 52 during the injection molding process. Two side doors 56 are covered with elastomeric material, as in the apron door 58, each side door includes channels 56A and 56B (shown in phantom) for molding of the polymeric material surrounding the small brace 18 and large brace 19, respectively. As with the apron door 58, side doors 56 sealably engage and hold the bathtub shell to mold receptor 52 during the injection molding process.

A plurality of ejectors 60 are positioned in the mold receptor 52 which serve to separate and eject the molded bathtub 10 from the mold receptor 52 after the molding process has been completed. Preferably, the ejectors (shown in FIGS. 9 and 10) are cylindrical rods which are hydraulically activated, from a recessed position to an ejected position and vice versa.

Efforts have been made to minimize the amount of distortion, bow and warpage of the deck due to the shrinkage of the polymeric material as it cures. In particular, a deck insert was formed having protrusions at both ends. However, some of the shells had a downward concave bowing of their shell deck. This was a result of stresses in the steel shell caused both during the stamping and the enamelling process which can result in unpredictable bowing and warpage of the shell. The distortion of the shell would sometimes result in the inhibition of the flow of polymeric material about the protrusions at the ends of the deck insert. This resulted in the thin, uneven and irregular application of polymeric material to the outer ends of the deck portion of the shell. Thus, some tubs would not meet the manufacturer's stringent quality control standards and would be rejected.

Surprisingly, it has now been found that the amount of bowing, warpage and distortion of the deck can be decreased while lowering the rejection rate and increasing the efficiency of the manufacturing process by removing the end projections of the deck insert, or by changing the dimensions of the end projections.

As shown in FIGS. 9 and 10, a preferred deck insert 34 is removably attached to the mold receptor deck. The insert 34 is shaped to reduce the cross-sectional area of the void formed between the top portion of the deck insert 34 and the non-finish side 26 of the deck 12 of shell 22. The deck insert 34 has a rim 42 and a plurality of convex non-outermost projections 36, and at least one convex outermost projection 35. The projections 35 and 36 are preferably bevelled around their periphery 40 at an angle of about 45° from the base of the insert. The convex shape of the projections (35 and 36) permits the insert to be released more easily from the hardened polymeric material. The height of the projections (35 and 36) may preferably range from about 0.10" to about 0.25". The width of the projections (35 and 36) may preferably range from about 2" to about 3.75". The length of the projections (35 and 36) may preferably range from about 2" to about 58". The projections (35 and 36) preferably displace from about 4% to about 80% of the polymeric material underlying the deck 12 of molded bathtub 10. A preferred embodiment of the present invention also includes the use of the apron inserts referred to in the aforementioned commonly assigned U.S. patent application Ser. No. 07/458,598 to Marsilio et al., and produces a molded article, such as a bathtub, having an apron area of reduced thickness 21 in the polymeric material on the inner side of the apron. The apron area of reduced thickness 21 is surrounded on each side of its periphery by a lip 21A having a chamfer of approximately 45° from the base of the insert.

FIG. 10 includes an assembly view of bolts 39, locators 38 and the preferred extended deck insert 37. Locators 38 are placed about the periphery and at the bottom of the mold receptor face 84 as is illustrated in FIGS. 9 and 10. The locators 38 are preferably made of an elastic, non-stick material such as, for example, rubber or polyurethane. The locators 38 serve to maintain a suitable distance between the shell and the mold sufficient for molding to occur. The locators 38 also prevent the shell and mold receptor face 84 from scratching, denting or otherwise damaging each other and establish a cavity between the mold the shell to accommodate the layer of polymeric material.

The preferred deck insert is illustrated in FIGS. 11 and 13. The outermost projections 35 are located a distance from the outer edges 37 of the insert which is from about 8% to about 24% of the distance between the outer edges 37 of the deck insert 34 so that when the deck insert 34 is placed in the mold it will produce indentations in the polymeric material underneath the deck which are located at a ratio of from about 8% to about 24% of the distance between the outer edges 12A of the deck 12. Preferably, the distance between outermost projections 35 and outer edges 37 is from about 12% to about 20% and most preferably, about 16% of the distance between the outer edges 37 of the deck insert. Alternatively, the distance between the outermost projection 35 and the deck edge 37 can be from about 4.875" to about 14.625". Preferably, the distance between the outermost projection 35 and the deck edge 37 is from about 7.3125" to about 12.1875" and is most preferably about 9.75".

In the embodiment illustrated in FIGS. 11 and 13 the distance is about 17% of the distance between deck edges 37. The deck insert 34 is removably attached to the mold receptor deck by bolts 39. Alternatively, other suitable attachment means such as mechanical, hydraulic, suction or magnetic attachment means may be used.

An alternative reduced end deck insert 34a is illustrated in FIGS. 14 and 15. The end projections 36a are of a lower height than projections 36 and serve to reduce the amount of bowing, warpage and distortion in molded extended deck tubs, while also reducing the cost of manufacture by decreasing the amount of polymeric material used in molding the tub. Preferably, end projections 36a are from about 25% to about 75% and, most preferably, about 50% of the height of projections 36.

Figure 16:
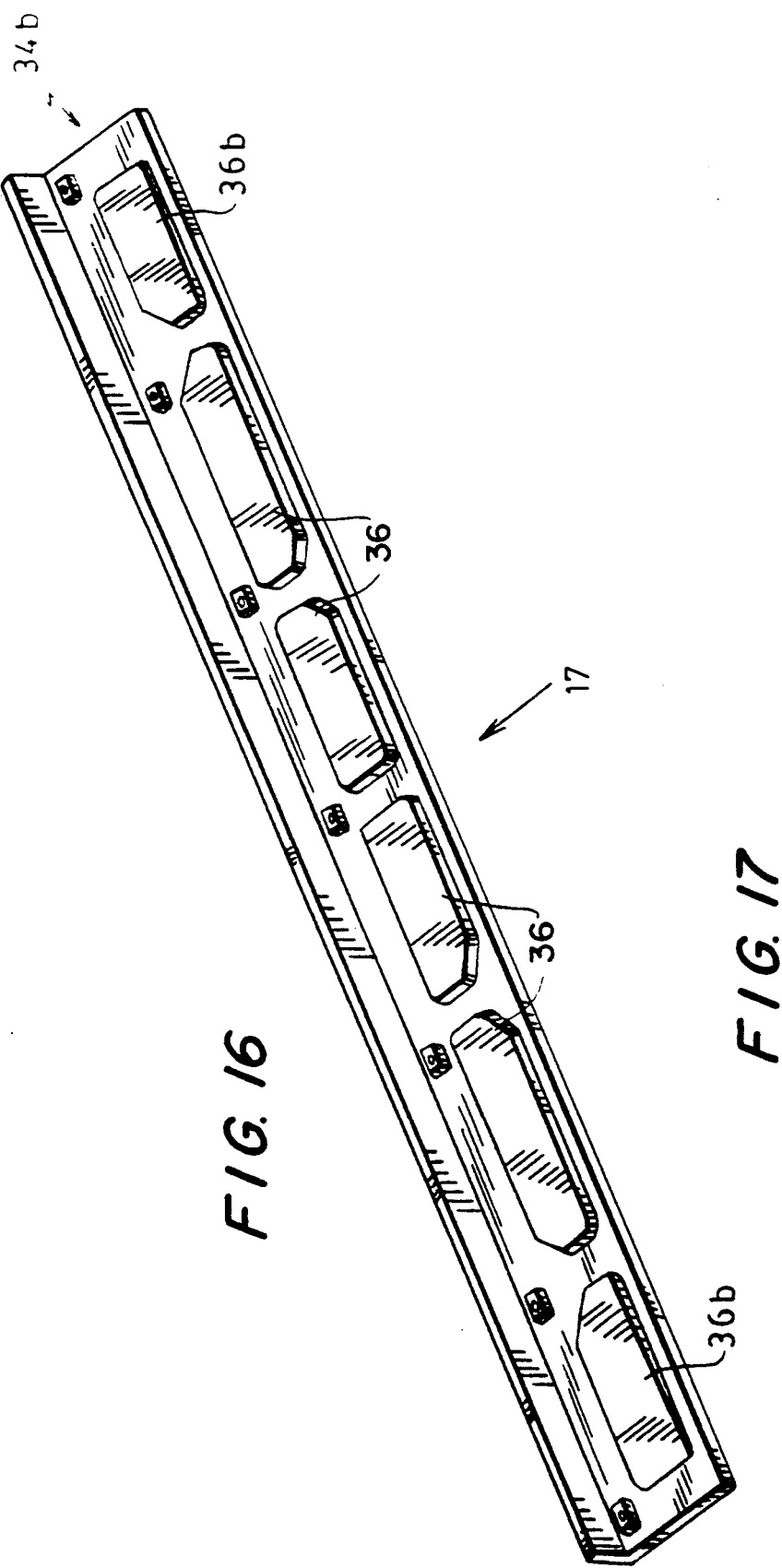
FIG. 16 is an elevated perspective view of another alternative embodiment of the extended deck insert of the present invention.
Figure 17:
FIG. 17 is a side elevational view of the extended deck insert of FIG. 16 taken in the direction of arrow 17.

A tapered end embodiment is illustrated in FIGS. 16 and 17. The tapered end projections 36b, taper downwardly toward the ends of the tapered end deck insert 34b. The tapered end projections 36b, along with projections 36, serve to reduce the amount of bowing, warpage and distortion in molded extended deck tubs, while also reducing the cost of manufacture by decreasing the amount of polymeric material used in molding the tub. Preferably, the larger end 36b' is from about 0.292" to 0.094" high and the smaller end 36b" ranges from about 50% to about 0.0% of the height of 36b'. Most preferably, the larger end 36b' is about 0.188" high and 36b" is 0.0".

In the process of making the molded bathtub according to the present invention, a deck insert (34, 34a or 34b) is removably attached to the mold receptor 52, preferably, by bolts 39 placed through locators 38, locator opening 41B and threaded mold receptor opening 41A. FIG. 12 illustrates a locator 38 and locator opening 41B. Prior to molding, the mold receptor face 84 and deck insert (34, 34a or 34b) are coated with a suitable mold release agent, preferably a silicone release agent. Other suitable release agents include, for example, a Teflon coating, wax coating or silicon coating. Additionally, prior to each day of molding, the entire mold surface is waxed. A bathtub shell 22 which has been suitably primed on its non-finish side 26, preferably with a silicone or other suitable molding primer, is placed in mold receptor 52 atop locators 38 leaving a void between the mold receptor face 84 and the non-finish side 26 of the bathtub shell 22. The extended deck 12 of shell 22 is positioned above and parallel to the deck insert (34, 34a or 34b) leaving a void for introducing polymeric material 15. Preferably, the drainage, overflow and other openings are plugged prior to introduction of the polymeric material. The plugs can be removed after the molding process has been completed.

The shell is sealably retained to the mold receptor 52 by lowering a male mold closing means 54 which engages the finish side of the bathtub shell including reservoir 14 and shell deck 12. Two side doors 56 are closed to form sealed molding channels 56A and 56B about small brace 18 and large brace 19 of bathtub shell 22. Front apron door 58 sealably engages the finish side 24 of apron 20 and seals to the rim of male mold closing means 54 and side doors 56 thus forming a sealed continuous injection molding cavity for the introduction of polymeric material 15.

The hardenable polymeric material 15 is introduced from the mix head 82 through the aperture in the bottom of mold receptor 52 to fill the molding cavity with the hardenable polymeric material 15, preferably, a hardenable polymeric foam material, injected under suitable molding pressure. It is preferred to maintain the temperature of the hardenable polymeric material 15 in the range of about 85° F. to 105° F., preferably, at about 95° F. The curing of the polymeric material 15 is exothermic, so that initially the temperature of the mold receptor 52 will be raised, and later during the curing the mold receptor 52 should be cooled. In order to accomplish this dual task, the mold receptor 52 should be made from a good heat conducting material, preferably a metal such as aluminum.

The cooling and heating of the mold receptor 52 is preferably accomplished using a water jacket or other suitable heat reservoir maintained at the preferred temperature range. Since the deck insert (34, 34a or 34b) contacts a large surface of the polymeric material 15, preferably, the deck insert 34 is also constructed of a good heat conducting material, such as aluminum. This serves to improve the flow of the polymeric material and helps eliminate areas of incomplete curing, choking and uneven flow of polymeric material 15 reducing distortion in the deck 12 of the molded bathtub 10.

After the molded polymeric material 15 has sufficiently hardened, the apron door 58 and the side doors 56 are opened and male mold closing member 54 is retracted. The molded bathtub 10 is lifted partially out of the mold receptor 52 by hydraulic ejectors 60. The ejectors 60 force the molded bathtub 10 upward. The molded bathtub 10 is then manually or mechanically removed from the mold receptor 52.

Thus, while there have been described what are presently contemplated preferred embodiments of the present invention, further changes and modifications could be made by those skilled in the art without departing from the scope of the invention, and it is contemplated to claim all such changes and modifications.

We claim:

1. A molded sanitary fixture comprising a shell having a reservoir and a deck on one side of an open end of said reservoir, the shell having an interior non-finish side and an exterior finish side, the non-finish side being coated with a polymeric material which extends beneath the deck, said deck extending in a longitudinal direction a length along one side of said reservoir, and having opposed ends, one at either end of said reservoir, the deck having at least one area of reduced thickness in the polymeric material coating the deck, said area of reduced thickness being at least a distance from an opposed end of the deck which is from about 8% to about 24% of the length of the deck of the sanitary fixture.

2. The sanitary fixture of claim 1 wherein the distance is from about 12% to about 20% of the length of the deck of the sanitary fixture.

3. The sanitary fixture of claim 1 wherein the distance is about 16% of the length of the deck of the sanitary fixture.

4. The sanitary fixture of claim 1 wherein said area of reduced thickness in the polymeric material includes a chamfered edge.

5. The sanitary fixture of claim 4 wherein said chamfered edge has an angle of about 135° from the deck.

6. A molded sanitary fixture comprising a shell having a reservoir and a deck on one side of an open end of said reservoir, the shell having an interior non-finish side and an exterior finish side, the non-finish side being coated with a polymeric material which extends beneath the deck, said deck extending in a longitudinal direction a length along one side of said reservoir and having opposed ends, one at either end of said reservoir, the deck having at least one area of reduced thickness in the polymeric material coating the deck, said area of reduced thickness being at least a distance from an opposed end of the deck which is from about 4.875" to about 14.625".

7. The sanitary fixture of claim 6 wherein the distance is from about 7.3125" to about 12.1875".

8. The sanitary fixture of claim 6 wherein the distance is about 9.75".

9. The sanitary fixture of claim 6 wherein said area of reduced thickness in the polymeric material includes a chamfered edge.

10. The sanitary fixture of claim 6 wherein said chamfered edge has an angle of about 135° from the deck.

11. A molded sanitary fixture comprising a shell having a reservoir and a deck on one side of an open end of said reservoir, the shell having an interior non-finish side and an exterior finish side, the non-finish side being coated with a polymeric material which extends beneath the deck, said deck extending in a longitudinal direction along one side of said reservoir, the deck having at least one outermost area of reduced thickness and at least one non-outermost area of reduced thickness in the polymeric material coating the deck, said outermost area of reduced thickness having a greater thickness of polymeric material than said non-outermost area of reduced thickness.

12. The sanitary fixture of claim 11 wherein said outermost area of reduced thickness is from about 25% to about 75% of the thickness of said non-outermost area of reduced thickness.

13. The sanitary fixture of claim 11 wherein said outermost area of reduced thickness if about 50% of the thickness of said non-outermost area of reduced thickness.

14. A molded sanitary fixture comprising a shell having a reservoir, a deck on one side of an open end of said reservoir, the shell having an interior non-finish side and an exterior finish side, the non-finish side being coated with a polymeric material which extends beneath the deck, said deck extending in a longitudinal direction along one side of said reservoir and having a middle portion and opposed ends, one at either end of said reservoir, the deck having at least one area of reduced thickness in the polymeric material coating the deck, said area of reduced thickness including at least one outermost area of reduced thickness and at least one non-outermost area of reduced thickness, said outermost area of reduced thickness varying in thickness from a maximum thickness near an opposed end of the deck to a minimum thickness near the middle portion of the deck.

15. The sanitary fixture of claim 14, wherein said maximum thickness is from about 0.292" to about 0.094" and said minimum thickness is from about 50% to about 0.0% of the thickness of said maximum thickness.

16. The sanitary fixture of claim 14, wherein said maximum thickness is about 0.188 and said minimum thickness is about 0.0".

* * * * *